Dec. 9, 1930.  C. L. FARRAND  1,784,517
MOTOR FOR LOUD SPEAKERS
Filed Sept. 25, 1928  5 Sheets-Sheet 1

INVENTOR
Clair L. Farrand
BY
Pennie, Davis, Marvin Edmonds
ATTORNEYS

Dec. 9, 1930.  C. L. FARRAND  1,784,517
MOTOR FOR LOUD SPEAKERS
Filed Sept. 25, 1928  5 Sheets-Sheet 2

INVENTOR
BY
ATTORNEYS

Dec. 9, 1930.  C. L. FARRAND  1,784,517
MOTOR FOR LOUD SPEAKERS
Filed Sept. 25, 1928   5 Sheets-Sheet 3

Dec. 9, 1930.   C. L. FARRAND   1,784,517
MOTOR FOR LOUD SPEAKERS
Filed Sept. 25, 1928   5 Sheets-Sheet 4

INVENTOR
Clair L. Farrand
BY
ATTORNEYS

Dec. 9, 1930.  C. L. FARRAND  1,784,517
MOTOR FOR LOUD SPEAKERS
Filed Sept. 25, 1928  5 Sheets-Sheet 5

Patented Dec. 9, 1930

1,784,517

UNITED STATES PATENT OFFICE

CLAIR L. FARRAND, OF FOREST HILLS, NEW YORK, ASSIGNOR TO FARRAND INDUCTOR CORPORATION, OF JERSEY CITY, NEW JERSEY, A CORPORATION OF DELAWARE

MOTOR FOR LOUD-SPEAKERS

Application filed September 25, 1928. Serial No. 308,294.

This invention relates to electro-magnetically actuated loud speakers.

The general trend in loud speaker design at the present time is to so construct and mount the diaphragm and the parts of the electro-magnetic system that the reactionary forces throughout the entire combination are reduced to a minimum and fall well below the reactionary force exerted by the air against the diaphragm during its vibration. The actuating mechanism, or motor, of the so-called electro-dynamic speaker follows this trend because the coil armature, characteristic of that type of motor, moves in a path parallel with the faces of the field poles and therefore there is no necessity of supplying for the armature coil an elastic restraint of the kind that is necessary, for instance, to control the armature in an electro-magnetic system of the balanced armature type. However, electro-dynamic loud speakers are expensive to manufacture and require an electrically energized field magnet and have certain other disadvantages which have prompted various attempts to replace the armature coil by a reciprocating magnetic armature so mounted as to be capable of a movement analogous to that of the coil, that is, in a path parallel with the faces of the field poles. So far as I am aware no one has been successful in producing a loud speaker of that type which is efficient over the entire frequency range, and which is capable of reproducing the lowest and highest frequencies with sufficient fidelity. I have discovered that this is due, among other things, to an improper relation between the armature and the pole faces which results in magnetic forces that interfere with the desired movements of the armature. If this force is in opposition to the force that produces the desired movement of the armature the armature may be said to possess magnetic stiffness. If it is in the same direction as the force which produces the desired movement of the armature it may conveniently be called magnetic negative stiffness. Magnetic stiffness is a reactionary force of the kind which should be reduced or eliminated if the herein described type of loud speaker is to follow and promote the above mentioned trend. Magnetic negative stiffness is likely to result in distortion. When the armature is not properly related to the pole faces the flux passing between the poles at one end of the armature unit does not increase at the same rate that the flux decreases between the poles at the other end of the armature unit throughout the maximum stroke of the armature. The total flux will, therefore, not remain a constant quantity. There will be one or more positions of the armature unit in which the total flux will be the greatest, and the armature unit will seek and tend to remain in those positions. If the normal position of the armature unit is a central one, and if it seeks this position and tends to remain in it because of a greater total flux at this position, the armature has magnetic stiffness. If the total flux is greater in some outward position of the armature unit, the armature will seek and tend to remain in that position in which case the armature has magnetic negative stiffness.

According to my invention I provide a motor, or electro-magnetic actuating mechanism for loud speakers which may be considered as having its origin in the above described type of device wherein a magnetic armature moves in a path parallel with the pole faces, but I so alter that arrangement as to its armature, its pole pieces, or both, and so construct it in other particulars that the magnetic stiffness of the armature is reduced to the desired extent preferably at least to zero and the device operates efficiently over the entire frequency range and reproduces the lowest and highest frequencies with remarkable fidelity. The reduction in magnetic stiffness of the armature renders it free to respond immediately and fully to any force tending to displace it without any tendency to restore itself to its original or any other position. By the proper use of the condition which make for this result I can either eliminate the magnetic stiffness of the armature altogether or can retain any degree of it to be utilized as a slight centering force for the armature when so desired.

I utilize a reciprocating armature unit each end portion of which projects into an air gap between a pair of field poles, but the portion of the armature unit so projecting into its gap terminates at an intermediate point in the gap so that each end of the armature unit overlaps a part only of the corresponding pole faces. If one end of the armature unit overlaps the inner portion of the corresponding pole faces the other end of the armature unit should overlap the inner portion of its corresponding pole faces, and likewise if an end portion of the armature unit overlaps the outer portion of the corresponding pair of pole faces, the other end portion of the armature unit should overlap the outer portion of its corresponding pole faces. In this way redistribution of the flux at the two pairs of poles by means of a varying current in coils associated either with the pole pieces or with the armature unit will result in a reciprocation of the armature unit.

In order to obtain greater efficiency and a better reproduction of the higher and perhaps lower frequencies, I so construct the armature unit that the end portions which lie between the pole faces are separated by non-magnetic material or magnetic material of small cross-sectional area so that between the two portions of the armature there is a medium of relatively high reluctance. In effect, this provides two separate armatures—one for each gap—but structurally united to move as a unit. This results in a magnetic coupling between the pole winding at opposite sides of the armature unit and produces better results than if this magnetic coupling were prevented by an armature which is made of magnetic material of high permeability from one end to the other and which thus affords a path for the flux longitudinally through the armature.

I have discovered that the magnetic stiffness of the armature may be reduced or eliminated by properly adjusting the amount of overlap between each end portion of the armature unit and the corresponding pole faces when the armature is in its normal position. It is reasonable to suppose that a reciprocating armature having end portions projecting part way in the air gaps as described above should have an effective length such that its end portions extend a considerable distance into the gaps, and it would seem from standard practice in motor design that the effective length of the armature should correspond with the distance from the actual center of the pole faces of one gap to the actual center of the pole faces of the other gap. I have found, however, that in such an arrangement the armature has a strong centering tendency which produces a magnetic drag or stiffness which has to be overcome when the armature is moved in either direction.

I therefore construct the pole pieces, or the armature, or both to bring about a predetermined relation between them preferably one which will reduce the magnetic stiffness of the armature to zero. This relation is such that flux passing between the poles at one end of the armature unit will increase at substantially the same rate that the flux passing between the poles at the other end of the armature unit decreases, and vice versa, so that the total flux is always a substantially constant quantity, and there will be no position to which the armature unit tends to move because of a greater total flux at that position.

In the accompanying drawings:

Figs 1 to 8 inclusive illustrate various forms of motors whose armature units are so constructed that the portions in the air gaps are separated by non-magnetic material.

Figure 1:
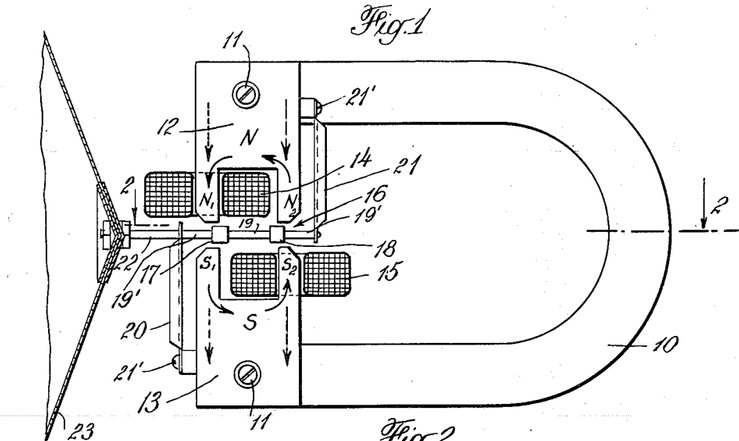
Fig. 1 being a side view of a motor having a permanent field magnet.
Figures 2, 3, 6:
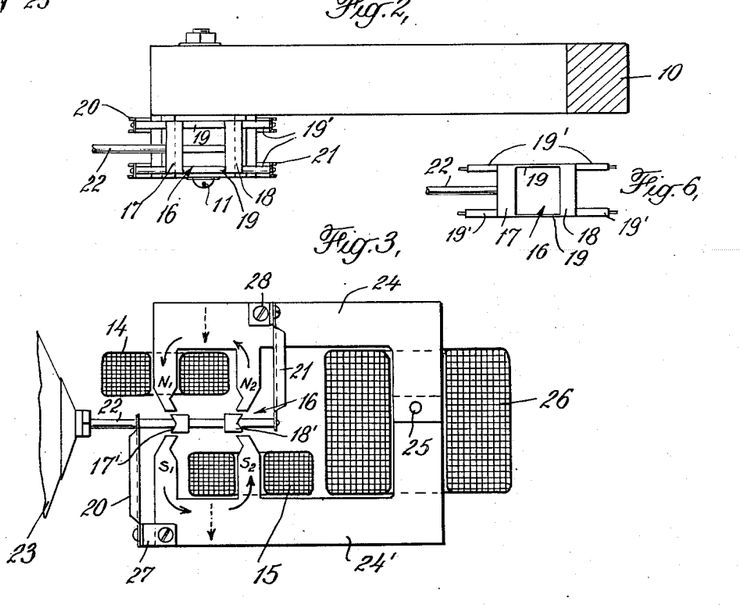
Fig. 2 an edge view of the motor shown in Fig. 1.
Fig. 3 a side view of a modified form of motor having an electrically energized field magnet.
Fig. 6 a detail view illustrating how the armature unit may be stamped from one piece of metal.

Referring to Figs. 1 and 2, numeral 10 designates a permanent magnet of the horseshoe type, to the ends of which are attached by suitable means, such as bolts 11, the laminated pole pieces 12 and 13, the former representing the north pole and the latter the south pole. These pole pieces 12 and 13 are bifurcated so as to form double poles, the poles of the pole piece 12 being designated $N_1$ and $N_2$, and the poles of pole piece 13 being designated $S_1$ and $S_2$. Mounted on poles $N_1$ and $S_2$ are coils 14 and 15 respectively. These coils 14 and 15 are preferably reversely wound so as to generate flux of opposite sense when energized in accordance with the electrical impulses which are to be converted into sound waves by the loud speaker, such as when these coils are connected to the output of a radio receiving set or the like.

Mounted in the air gaps between poles $N_1$, $N_2$ and $S_1$, $S_2$ is the armature unit 16 comprising two magnetic portions 17 and 18 such as bars or strips of silicon steel, or the like, one of these portions being arranged adjacent the $N_1$, $S_1$ poles and the other being arranged adjacent the $N_2$, $S_2$ poles. The portions 17 and 18 of the armature unit are disposed with respect to the aforesaid poles so as to partly overlap their faces in the manner illustrated.

The magnetic portions 17 and 18 are connected together by non-magnetic bars 19 of high reluctance material, such as German silver, nichrome or the like, which project beyond the portions 17 and 18 and serve as supports 19' for the armature unit thus formed. The projecting portions 19' are connected at their ends to springs 20 and 21, which are anchored at their opposite ends to the pole pieces 13 and 12, respectively, by means of screws 21' or the like. The springs 20 and 21 are preferably formed of some light sheet metal such as duralumin and are provided with stiffening flanges along their sides, but these stiffening flanges do not extend to the ends of the springs, so that they are freely flexible at these points, the purpose of the flanges being to prevent the springs from vibrating independently and audibly. The driving rod 22 is suitably connected to the armature unit 16 at one end and to a suitable diaphragm 23 at the other end as shown, this diaphragm preferably being the familiar cone type.

As shown in Fig 6, the armature unit 16 may be conveniently made of one piece, stamped from suitable magnetic material, the bars 19 being formed as thin as possible so as to form relatively high reluctance connections between the magnetic bars 17 and 18. In the same way, the driving rod 22 and the extensions 19' may be stamped from the same piece, whereby considerable economy in manufacture is effected. It will be seen that as the portions 17 and 18 of the armature are separated by a medium of relatively high reluctance, there is no path between them for the flow of any appreciable flux. The flux set up between the $N_1$ and $S_1$ poles flows directly across the gap between them and transversely through bar 17, while the $N_2$, $S_2$ flux flows transversely through bar 18. Therefore, the windings on opposite sides of the armature unit are magnetically coupled together instead of being magnetically shielded from each other as would be the case if the whole armature were a magnetic conductor or if the portions 17 and 18 were magnetically connected together.

Assuming that the normal flux of horseshoe magnet 10 flows in the direction of the dotted arrows shown in Fig. 1 and that current flows counter-clockwise and clockwise in coils 14 and 15, respectively. This will induce lines of force in the direction of the solid arrows to add to and thus increase the flux between poles $N_1$ and $S_1$ and oppose and thus decrease the normal flow of flux between poles $N_2$ and $S_2$. Accordingly, bar 17 and armature unit 16 are drawn to the left as seen in Fig. 1. The amplitude of movement of bar 17 is obviously proportional to the intensity of the electro-magnetic effects produced by the flow of current in coils 14 and 15. Conversely, if clockwise and counter-clockwise currents flow through coils 14 and 15, respectively, the flux intensity will be reversed, that is, it will increase from pole $N_2$ to pole $S_2$, and decrease between poles $N_1$ and $N_2$, whereby armature unit 16 will be drawn between poles $N_2$ and $S_2$.

The leakage flux which retards the movement of the armature, is reduced by tapering or beveling the outer corners of the four poles as shown in Fig. 1, so that the pole faces in the direction of movement of the armature unit are substantially the same width as the armature bars 17 and 18. It is preferable to have the armature portions as wide as the pole faces. Because of this efficient transfer and use of working flux a simple permanent magnet may be used.

Fig. 3 illustrates the invention applied to a motor having an electrically energized field magnet. In this modification the magnet is laminated, being formed of two like members 24 and 24' which are secured together by a rivet 25 or the like so that the pole pieces will be held in rigid spaced relation. The magnetic field between poles $N_1$, $S_1$, and $N_2$, $S_2$ is induced by constant current flowing in field winding 26 which is mounted upon the core structure 23—24. The armature unit 16 is mounted in the air gap between the poles in the same way as was described in connection with Fig. 1, except that the suspension springs 20 and 21 are secured to brackets 27 and 28 fixed to members 23 and 24, respectively. In this arrangement the paths of flux are the same as described heretofore, except that the pole pieces and armature portions are shaped to further reduce fringing or leakage flux. This is done by lengthening the path which the fringing flux would normally follow whereby its intensity is reduced.

Figure 4:
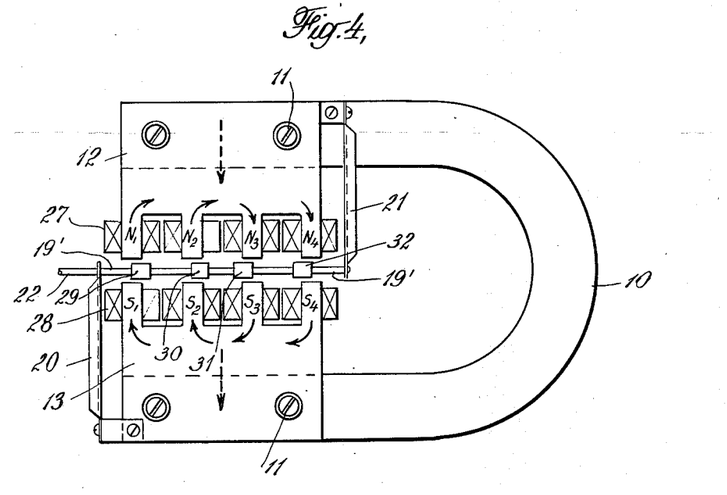
Figs. 4 and 5 side views of further modifications employing more than two pole pieces at each side of the armature unit.
Figure 5:
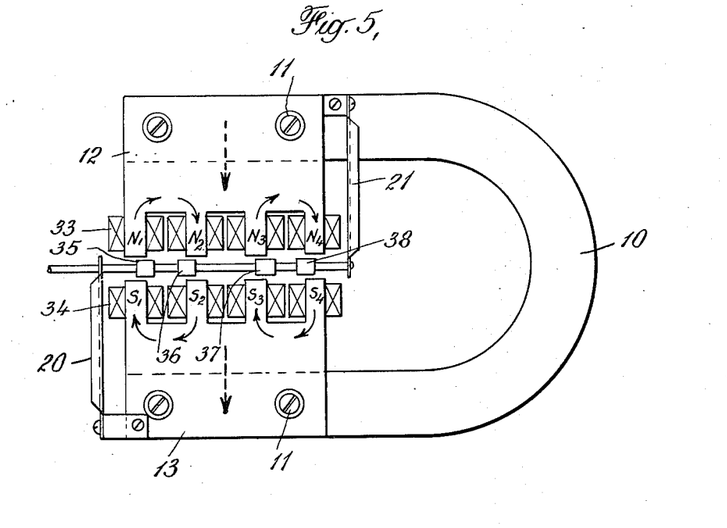

Figs. 4 and 5 show two embodiments of the invention as applied to motors having more than two poles on each side of the armature unit. Laminated pole pieces 12 and 13 are secured to the ends of horse-shoe magnet 10 by bolts 11 and are slotted to provide four opposed poles, these poles being designated $N_1$, $N_2$, $N_3$ and $N_4$ in pole piece 12, and $S_1$, $S_2$, $S_3$ and $S_4$ in pole piece 13. Coils 27 are mounted on the N poles and coils 28 on the S poles, these coils being wound to increase the flux in the four left hand poles and decrease it in the four right hand ones, and vice versa. When the flux in paths $N_3$—$S_3$ and $N_4$—$S_4$ increases and the flux in paths $N_1$—$S_1$ and $N_2$—$S_2$ decreases, the armature will move from left to right, the armature bars 31 and 32 being disposed with respect to the poles in such a way that they are drawn toward coincidence with poles $N_3$—$S_3$ and $N_4$—$S_4$ by the said increased flux, while armature bars 29 and 30 are simultaneously withdrawn from poles $N_1$—$S_1$ and $N_2$—$S_2$. Obviously, the reverse is true when the flux increases in paths $N_1$—$S_1$ and $N_2$—$S_2$ and decreases in paths $N_3$—$S_3$ and $N_4$—$S_4$, to cause movement of the armature from right to left.

In Fig. 5 the coils 33 and 34 are so connected and arranged on their respective N and S poles, that the flux in paths $N_2$—$S_2$ and $N_4$—$S_4$ increases while the flux in paths $N_1$—$S_1$ and $N_3$—$S_3$ decreases in the manner indicated by the arrows, and vice versa. When the armature bars 35, 36, 37 and 38 are arranged with respect to each other and to the poles as shown in the drawing the variation in current in the coils will result in a reciprocation of the armature unit.

Figure 7:
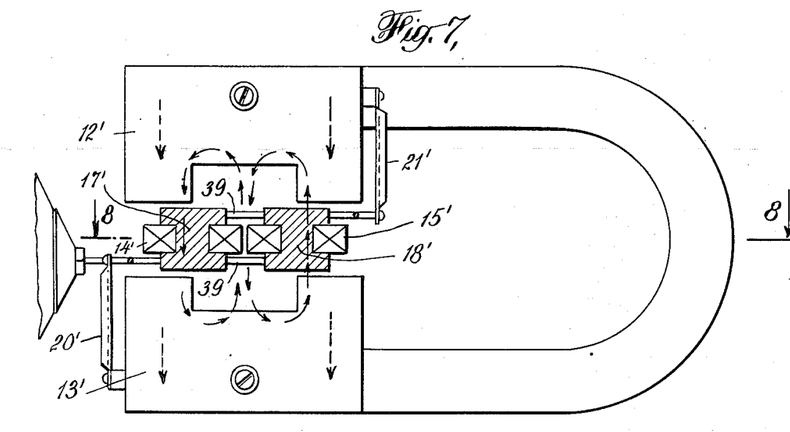
Fig. 7 a side view partly in section of a further modification, and Fig. 8 a longitudinal section through the armature unit.
Figure 8:
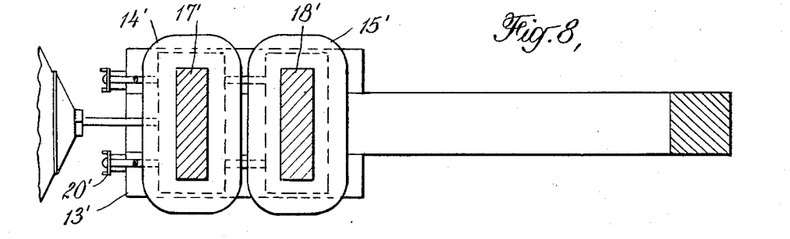

Instead of utilizing coils on the pole pieces of the field magnet for altering the flux distribution in the field poles, coils may be associated with the armature unit. This is illustrated in Figs. 7 and 8 in which pole pieces 12' and 13' correspond with the pole pieces 12 and 13 of Fig. 1, but they have no coils associated with them. The coils are mounted on the armature bars 17' and 18' and are shown at 14' and 15' respectively. The armature bars are substantially separate in a magnetic sense as in the forms above described, but are structurally united as by means of the pins or bars 39. Two of these pins may be connected at one end of the armature unit with springs 20' corresponding with the spring 20 of Fig. 1 and the other two may be connected at the other end of the armature unit with springs 21' corresponding with the spring 21 of Fig. 1. The coils 14' and 15' are so wound that when they are energized the flux between the poles at one end of the armature unit is increased while that at the other end is decreased and vice versa. This results in a reciprocation of the armature unit when the coils 14' and 15' are energized by varying current.

Figure 9:
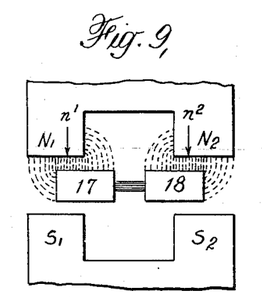
Figs. 9 to 24 inclusive are explanatory diagrams and curves illustrating the effect of adopting the proper relation between the armature unit and the pole faces.
Figure 10:
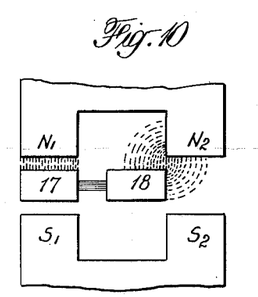

While the use of a divided armature, that is, one in which the end portions are separated by a medium of relatively high reluctance, as in all of the forms hereinbefore described, makes for greater efficiency and a better reproduction of the higher and lower frequencies, there is yet to be considered the magnetic stiffness of the armature unit referred to above. Figs. 9 to 24 are explanatory of the cause of this condition and its remedy. If the armature unit is given an effective length equal to the distance between the actual centers of the pole faces in accordance with standard practice as represented in Fig. 9, the magnetic stiffness of the armature or, in other words, the centering effort tending to return the armature unit to its central position is much greater than would be expected. The reason for this will be made clear when the flux between the poles at one end of the armature unit is compared with the flux between the poles at the other end of the armature unit for various positions of the armature. Let it be assumed that the armature unit shown in Fig. 9 has been displaced to the position shown in Fig. 10 in which the outer face of the armature bar 17 is in coincidence with the outer edges of the poles $N_1$ and $S_1$. With this as a starting point the flux changes which take place between the poles $N_1$ and $S_1$ will be considered as the armature unit makes a complete excursion to the right to the position shown in Fig. 11 in which the outer face of the armature bar 18 is in coincidence with the outer edges of the poles $N_2$ and $S_2$, after which the flux changes which take place between the poles $N_2$ and $S_2$ will be considered for the same movement of the armature movement. In the following discussion only the flux changes for which the movement of the armature is responsible will be considered because we are dealing with the magnetic stiffness of the armature unit resulting from flux changes due entirely to the movement of the armature regardless of the moving force.

Figure 11:
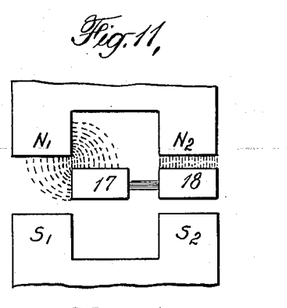
Figure 12:
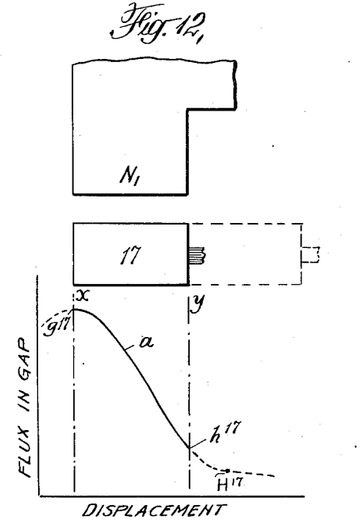
Figure 13:
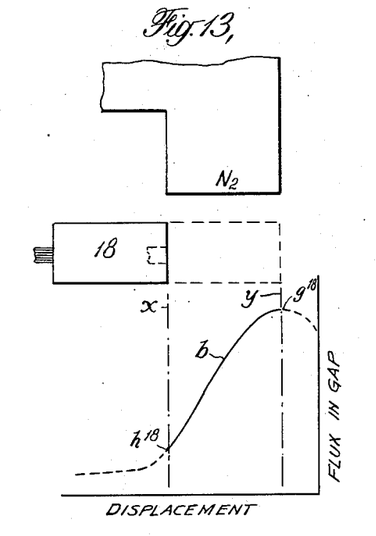

In Fig. 12 the starting position of the armature bar 17 is represented in full lines and its final position in dotted lines. The amount of displacement is represented by the vertical lines $x$ and $y$. The flux changes which take place between the poles $N_1$ and $S_1$ as the armature bar 17 moves to the dotted line position in Fig. 12 are represented graphically in this figure by the curve $a$. The abscissas represent displacement of the armature bar 17 and the ordinates represent the flux in the gap. At the start of the excursion, that is, when the armature bar 17 is in the full line position the flux will be the maximum as represented by the point $g^{17}$ on the curve. As the armature bar 17 moves to the right the flux gradually decreases. It has been found that the curve plotted for this decreasing flux has the shape shown in the drawing. The flux at the end of the stroke, that is, when the armature bar 17 is in the dotted line position in Fig. 12, is represented by the point $h^{17}$ on the curve. It should now be noted that if the armature bar continued its movement to the right the flux would continue to drop and the curve would continue a downward slope toward zero-flux as indicated by the dotted portion of the curve to the right of the line $y$. The point $h^{17}$ is located on the curve on a relatively steep part thereof and some distance above the points on the more flattened right hand extension of the curve. In other words, whereas the flux is the maximum when the armature bar 17 is in the full line position, it has not reached a corresponding minimum value when the bar 17 is in the dotted line position. The armature bar 17 would have to be displaced still further to the right in order for the point $h^{17}$ to assume a position on the lower part of the curve comparable with the position assumed by the point $g^{17}$ on the upper part of the curve. It has been found by actual experiments that the shape of the curve $a$ is such that if the point $h^{17}$ were at a lower position on the curve, for instance at point $H^{17}$, the curve between the points $g^{17}$ and $H^{17}$ would closely approximate a symmetrical portion of a substantially sine curve, the portion being that part of a sinusoidal curve which extends from the mid point of a positive crest to the mid point of an adjacent negative crest. However, when point $h^{17}$ is located on a relatively steep part of the curve $a$ as in Fig. 12, the curve, even though it is sinusoidal between the points $g^{17}$ and $h^{17}$ is, nevertheless, not symmetrical between these points. The reason why the flux in the dotted line position of the armature bar 17 in Fig. 12 (represented by point $h^{17}$) is not nearer to zero is because of the presence of a substantial amount of fringing flux as represented in Fig. 11 and this figure shows that the flux would continue to materially decrease for a further movement of the armature bar 17 toward the right. This is evident by comparing the representation of the flux in Fig. 11 with the representation of the flux in Fig. 18 in which a similar armature bar is shown displaced further to the right.

The flux changes which take place between the poles at the other end of the armature unit during the same excursion will now be considered. When the armature unit began the excursion which was supposed to have taken place for the purpose of the foregoing explanation, the armature bar 18 was in the full line position shown in Fig. 13 and eventually moved to the position shown by dotted lines. During this movement the flux varies in the same way as it did with respect to the armature bar 17, but in the opposite sense, as will be seen from the curve $b$ in Fig. 13. The point $h^{18}$ on the curve represents the flux at the beginning of the stroke of the armature bar 18 and is located at a point somewhat above the points on the more flattened left hand extension of the curve represented by the dotted line. In other words, when the armature bar 18 starts its stroke to the right its flux is materially above zero for the same reason that the flux at the other end of the armature unit is materially above zero when the armature bar 17 reaches the dotted line position shown in Fig. 12.

Figures 14, 15:
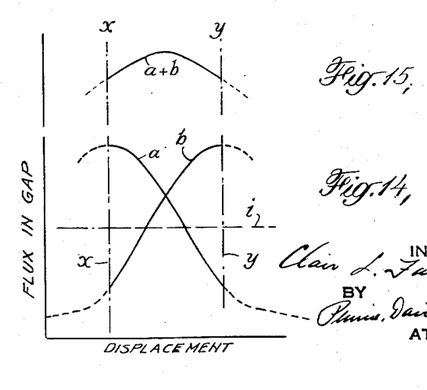
Figure 16:
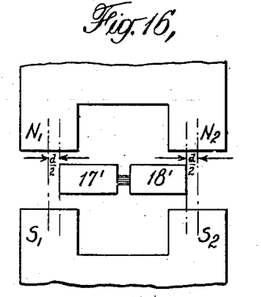
Figure 17:
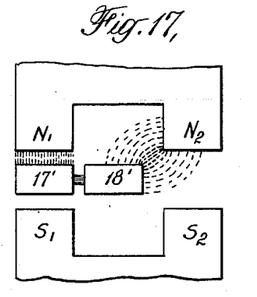
Figure 18:
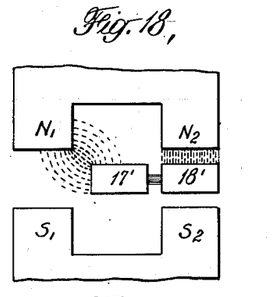
Figure 19:
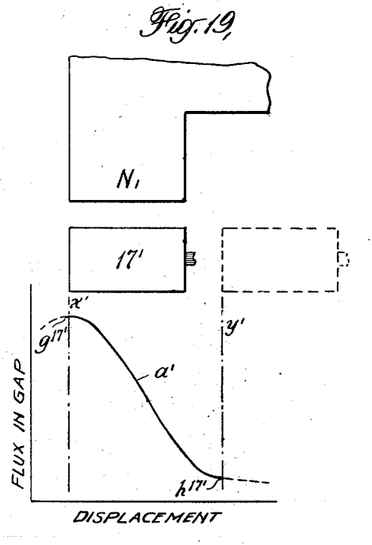
Figure 20:
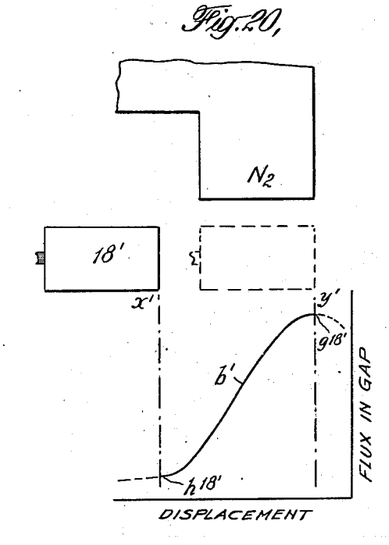
Figures 21, 22:
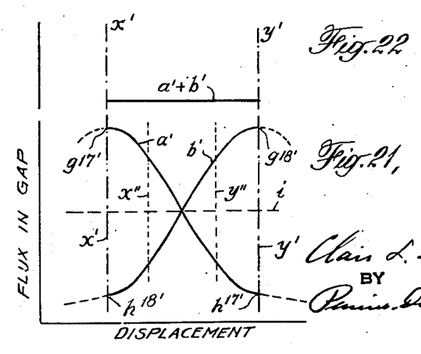

Now, if the unsymmetrical curves $a$ and $b$ are superposed as represented in Fig. 14 it will be seen that as the armature unit makes an excursion from its extreme left hand position toward the right and approaches its central position the flux between the poles at the right hand end of the armature unit increases at a faster rate than the flux between the poles at the left hand end of the armature unit decreases so that the curves $a$ and $b$ intersect at a point considerably above the line $i$ representing the average flux. After the armature unit passes its central position during its excursion to the right the flux between the poles at the right hand end of the armature unit increases at a lesser rate than the flux between the poles at the left hand end of the armature unit decreases. To produce a balanced condition and to have no restoring force in either direction, the flux between the poles at one end of the armature unit should increase at substantially the same rate as it decreases between the poles at the other end of the armature unit, and vice versa. In other words, the total flux at the two ends of the armature unit should always be a substantially constant quantity, but this is not true when the conditions are such as those just described, because by adding the curves $a$ and $b$ it will be found that a curve such as shown at $a+b$ in Fig. 15 is obtained. This curve shows that for the central position of the armature unit the total flux will be greater than for any other position of the armature unit. As the armature unit tends to move to a position in which it will pass the greatest amount of flux, it is obvious that there will always be a tendency for the armature unit to move back to its central position shown in Fig. 9 whenever it is displaced in either direction from this position. If the curve $a+b$ of Fig. 15 were a straight line, showing that the total flux remained a constant quantity, or in other words if the flux between the poles at one end of the armature unit increased at the same rate that it decreased between the poles at the other end, and vice versa, the armature unit would tend to remain in the position to which it is displaced and there would be no centering effort. This condition may be brought about by shortening the effective length of the armature unit so that its ends bear a more inward relation with respect to the pole faces. The amount which the armature unit should be shortened and its effect on the operation of the motor will be made clear from the following explanation, but in the meantime it should be taken for granted that Fig. 16 shows the armature unit 17'—18' shortened the correct amount to reduce the magnetic stiffness to zero. Figs. 17 to 22 correspond with Figs. 10 to 15 respectively, and show the changes in the flux conditions which take place for the shortened armature unit 17'—18' of Fig. 16 for the same kind of excursion, that is, one in which the armature unit starts from a position in which the outer face of the armature bar 17' is in coincidence with the outer edges of the poles $N_1$ and $S_1$ (as shown in Fig. 17) and moves to a position in which the outer face of the armature bar 18' is in coincidence with the outer edges of the poles $N_2$ and $S_2$ (as shown in Fig. 18). It will be seen from Fig. 19 that when the armature bar 17' starts its excursion to the right the flux is the greatest as represented by the point $g^{17''}$ on the curve $a'$. However, when the armature bar 17' reaches the end of its stroke as represented by dotted lines in Fig. 19, the displacement is now $x'-y'$ instead of $x$—$y$ as before and the flux for the right hand position of the armature bar 17′ will be represented by the point $h^{17\prime}$ on the curve. The curve $a'$ being longer than the curve $a$ of Fig. 12, the point $h^{17\prime}$ will be located at a lower point in the curve than is the case with point $h^{17}$ in Fig. 12. Likewise, with respect to the changes in the flux between the poles at the other end of the armature unit the point $h^{18\prime}$ (Fig. 20) will be located lower on the curve $b'$ than the point $h^{18}$ is located on its curve $b$ in Fig. 13. Now, when the curves $a'$ and $b'$ are superposed as shown in Fig. 21, they will be found to be in complete symmetry and will intersect on the average flux line $i$. This is due to the fact that the lowering of the points $h^{17}$ and $h^{18}$ (Figs. 12 and 13) on their respective curves so that they then occupy positions $h^{17\prime}$ and $h^{18\prime}$ (Figs. 19 and 20) causes each curve between the displacement lines to be a substantially symmetrical portion of a sine curve, the portion being that part which extends from the mid point of a positive crest of a sinusoidal curve to the mid point of an adjacent negative crest. When two such sinusoidal curve portions of opposite phase are superposed they will be symmetrical throughout. The sum of curves $a'$ and $b'$ will produce a curve $a'+b'$ which is substantially a straight line as represented in Fig. 22. The flux between the poles at one end of the armature unit will increase at substantially the same rate that the flux between the poles at the other end of the armature unit decreases throughout the stroke and vice versa, and the total flux will remain a substantially constant quantity. No matter in which position the armature unit happens to be, there is no other position in which the total flux will be any greater and therefore there is not tendency for the armature unit to return to a central position or to any other position.

It is true that for displacements of the armature unit greater than $x'$—$y'$ the curves will not be completely symmetrical throughout and their sum will not be a line which is straight from end to end, but the motor is designed for a maximum movement of the armature unit from the position shown in Fig. 17 to that shown in Fig. 18 and therefore the portions of the curves outside of the lines $x'$ and $y'$ in Fig. 21 may be disregarded. It is evident that for excursions of the armature unit through distances shorter than $x'$—$y'$ as for instance from line $x''$ to $y''$ (Fig. 21) the curves will still be sinusoidal and symmetrically disposed and their sum will be a straight line and therefore the same non-centering condition of the armature unit will exist.

It will now be seen that in order to bring about the conditions whereby points $h^{17}$ and $h^{18}$ will be lowered to their new positions $h^{17\prime}$ and $h^{18\prime}$ on the curves, the effective length of the armature unit of Fig. 9 should be shortened an amount which will increase the maximum stroke from the distance $x$—$y$ to the distance $x'$—$y'$. If this distance is represented by $d$ then each end of the armature of Fig. 9 should be shortened an amount $\frac{d}{2}$ as shown in Fig. 16. This has the effect of moving each end of the armature unit inwardly with respect to the corresponding pole faces a distance such that when one end of the armature is retracted from the corresponding pole faces the flux will be decreased more rapidly and will eventually reach a point lower on its curve than if the effective length of the armature unit were greater. It will be noted that if the overall length of the armature is shortened an amount greater than $d$ the points $h^{17}$ and $h^{18}$ will be shifted to a position still lower on their respective curves and a superposing of the flux curves would show that an unsymmetrical condition would be obtained as in Fig. 14, but the curves would intersect below the average flux line $i$. The sum of those two curves would be a line convexed downwardly instead of convexed upwardly as in Fig. 15. Such an armature therefore would possess a tendency to restore itself to either one of its extreme positions rather than a central one and the armature would possess magnetic negative stiffness, so I prefer to shorten the armature the amount $d$ and no more, so that the magnetic stiffness will be approximately zero.

The relation between the armature unit and the pole faces is a relative one and the desired result may be obtained by lengthening the distance from one pair of pole faces to the other pair rather than shortening the overall length of the armature unit.

Figure 23:
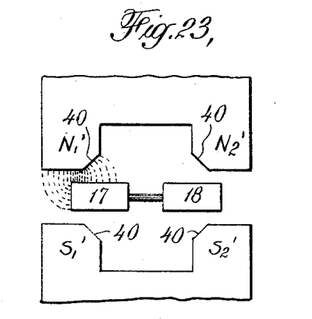

Fig. 23 shows a modification of the invention in which the fringing flux from each pair of pole faces to the retracted end of the armature in an arrangement like Fig. 9 is reduced by beveling the inner corners of the pole pieces as shown at 40. This is in the nature of a compromise between a condition in which the corners are not beveled (as in Fig. 9) and a condition in which the distance between the two pairs of pole faces is increased because increasing the distance between the two pairs of pole faces is almost the same as beveling the inner corners at such a sharp angle that the inner portions of the pole pieces are in effect eliminated altogether.

Figure 24:
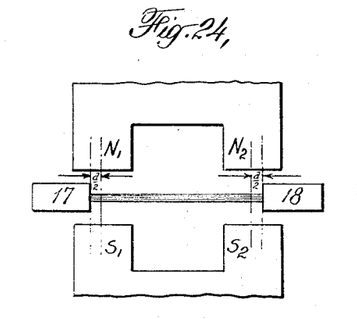

It is evident that the armature bars 17 and 18 may overlap the outer portions of the pole faces rather than the inner portions such as shown in Fig. 24. An increase in the flux between the poles $N_1$ and $S_1$ accompanied by a decrease in the flux between the poles $N_2$ and $S_2$ will shift the armature unit to the right and vice versa. In order to reduce the magnetic drag or centering effort in an armature unit of this type, the effective length of the armature unit, i. e. the distance between the inner faces of the armature bars 17 and 18 should be lengthened by the amount $d$, or in other words each inner face of the bars 17 and 18 should be shifted outwardly an amount $\frac{d}{2}$ to compensate for the fringing of the flux to the retracted ends of the armature bars.

It will now be seen that the magnetic stiffness or centering effort of the armature in a motor of the kind described may be reduced or eliminated by adopting the proper relation between the effective length of the armature unit and the pole faces. One way to view the invention is that the overall effective length of the armature unit is either decreased or increased (decreased in the case of an armature of the type shown in Fig. 9, and increased in the case of an armature of the type shown in Fig. 24) to compensate for fringing bars. Another way to view the invention is that the distance between the two pairs of pole faces is either increased or decreased with respect to the effective length of the armature to accomplish the same result, or the pole faces are so altered in construction as to bring about the same result. The effect of reluctance changes in each path between the opposite polar faces due to changes in permeability of the armature substance has been neglected and regarded as of no consequence. By actual test, curves can be plotted and approximate allowance may be made for these permeability changes if so desired.

By a suitable compromise between the conditions which make for the centering effort of the armature and the conditions which make for its avoidance, the armature unit of the motor may be made to retain any desired degree of centering effort so that it will always have a slight tendency to return to its central position. For instance, if the over-all length of the armature unit 17'—18' of Fig. 18 were slightly greater than shown in that figure, the armature unit would have a slight centering effort and the curve $a'+b'$ shown in Fig. 22 would be convexed upwardly to a slight extent but not to the great extent characteristic of the curve $a+b$ in Fig. 15.

The reason why the present type of motor is so critical as to the relative effective length of the armature unit is because the fringing flux is considerable in comparison with the direct flux. When a motor of the present type is used to actuate a direct acting conical diaphragm it must be designed to provide for the maximum amplitude of motion of the diaphragm which occurs at the lowest operating frequency. The practice at the present time requires an amplitude of motion of approximately $\frac{1}{32}$ of an inch. This is usual in electrodynamic speaker operation when operating at loud intensity and occurs at frequencies in the neighborhood of 40 to 100 cycles. In a motor of the present type if the armature is to have an amplitude of motion of $\frac{1}{32}$ of an inch, the pole faces should be approximately $\frac{1}{10}$ of an inch wide. Moreover, it is not possible to decrease the length of the air gap to less than five or ten thousandths of an inch. The effect which the fringing flux has upon the operation of the device under these circumstances will be more apparent if compared with the conditions in a conventional motor of the rotating type used at commercial frequencies wherein the armature and field design is such that the fringing flux is only a small percentage of the direct flux. The fringing flux is of less consequence in motors having pole faces of greater width and if the pole face is wide enough in relation to the other conditions the fringing flux might be neglected altogether.

I have found that springs of the type shown at 20 and 21 are admirable for use in mounting the armature unit because each spring connects the armature unit to a support located entirely to one side of the armature unit. The action approaches the principle of cantilever spring suspension and the motion of the armature unit is much freer than if it were mounted for instance by means of spring members each of which extends on opposite sides of the armature unit and is rigidly supported at its ends and connected at some intermediate point to the armature unit. In such a mounting the spring members are placed under considerable tension along their radii as the armature unit reciprocates and thus considerably lessens the freedom of motion of the armature unit.

I claim:

1. A motor for loud speakers comprising a reciprocating armature unit, a field magnet structure having at least one pair of poles forming at least one gap for the armature unit and an armature suspension comprising at least one flexible member at each end of the armature unit, each of said members being connected at one end to the armature unit and at its other end to a rigid support located to one side of the armature unit.

2. A motor for loud speakers comprising a reciprocating armature unit, a field magnet structure having at least one pair of poles forming at least one gap for the armature unit and an armature suspension comprising at least one flexible member at each end of the armature unit, each of said members being located wholly to one side of the armature unit and being connected at one end to the armature unit and at its other end to a rigid support.

3. A motor for loudspeakers comprising a field magnet structure having a plurality of poles whose polar faces form at least two gaps, a vibratile armature unit having portions extending into said gaps and movable therein in a path substantially parallel with said polar faces, and at least one coil associated with one of the parts of the motor to effect vibration of the armature unit when energized by varying current, the relation between said portions of the armature and said polar faces being such that the total flux across the gaps will remain substantially constant throughout a stroke of the armature from its position where the flux is the maximum across one of the gaps to its position where the flux is the maximum across the other gap.

4. A motor for loudspeakers in accordance with claim 3 in which the armature portions that extend into the gaps are separated from each other by a medium of relatively high reluctance.

5. A motor for loudspeakers in accordance with claim 3 in which the armature portions that extend into the gaps are separated from each other by a medium of relatively high reluctance and in which each of said portions is the same length as the pole faces measured in the direction of motion of the armature.

6. A motor for loudspeakers in accordance with claim 3 in which the armature portions that extend into the gaps are separated from each other by a medium of relatively high reluctance and in which the polar faces of the field magnet poles are substantially the same length measured in the direction of motion of the armature as the maximum armature stroke for which the motor is designed.

7. A motor for loudspeakers in accordance with claim 3 in which the armature portions that extend into the gaps are separated from each other by a medium of relatively high reluctance, the polar faces of the field magnet poles being substantially the same length measured in the direction of motion of the armature as the maximum armature stroke for which the motor is designed, and each of said portions of the armature being substantially the same length measured in the direction of motion of the armature as the polar faces.

8. A motor for loudspeakers comprising a field magnet structure having a plurality of poles whose polar faces form at least two gaps, a vibratile armature unit having portions extending into said gaps and movable therein in a path substantially parallel with said polar faces and at least one coil associated with one of the parts of the motor to effect vibration of the armature unit when energized by varying current, the relation between said portions of the armature and said polar faces being such that curves plotted for the changes of flux at the gaps which take place when the armature moves from a position in which the flux is the maximum across one gap to a position in which the flux is the maximum across the other gap, will be symmetrical and the sum of the two curves will be a substantially straight line curve.

9. A motor for loudspeakers comprising a field magnet structure having a plurality of poles whose polar faces form at least two gaps, a vibratile armature unit having portions extending into said gaps and movable therein in a path substantially parallel with said polar faces, and at least one coil associated with one of the parts of the motor to effect vibration of the armature unit when energized by varying current, the relation between said portions of the armature and said polar faces being such that the two curves plotted for the changes of flux which take place across the gaps for a stroke of the armature from a position in which the flux across one gap is the maximum to a position in which the flux across the other gap is the maximum will each be a symmetrical curve corresponding with that portion of a sinusoidal curve which extends from the midpoint of a positive crest of the curve entirely to the midpoint of the adjacent negative crest.

10. A motor for loudspeakers comprising a field magnet structure having a plurality of poles whose polar faces form at least two gaps, a vibratile armature unit having portions extending into said gaps and movable therein in a path substantially parallel with said polar faces, and at least one coil associated with one of the parts of the motor to effect vibration of the armature unit when energized by varying current, the relation between said portions of the armature and said polar faces being such that when the armature unit is in a position where the flux across one of the gaps is at its maximum, the flux across the other gap will be so far reduced as to lie at a sufficiently low point on a curve plotted for the flux changes at that gap caused by the armature movement as to make the curve between that point and the point of maximum flux density a symmetrical curve.

11. A motor for loudspeakers comprising a field magnet structure having a plurality of poles whose polar faces form at least two gaps, a vibratile armature unit having portions extending into said gaps and movable therein in a path substantially parallel with said polar faces, and at least one coil associated with one of the parts of the motor to effect vibration of the armature unit when energized by varying current, the relation between said portions of the armature and said polar faces being such that throughout a stroke of the armature unit of substantially one-sixteenth of an inch the total flux across the gaps will remain substantially constant.

12. A motor for loudspeakers comprising a field magnet structure having a pair of bifurcated pole pieces whose polar faces form two gaps, a vibratile armature unit having portions extending into said gaps and movable therein in a path substantially parallel with said polar faces, said portions of the armature being separated by a medium of relatively high reluctance, and at least one coil associated with one of the parts of the motor to effect vibration of the armature unit when energized by varying current, each of said portions of the armature unit being substantially the same length as the polar faces measured in the direction of movement of the armature, and the effective length of the armature unit being such that when the armature is moved to a position in which one of said portions of the armature is in coincidence with the corresponding polar faces, the other end portion of the armature will not extend all the way to and reach the gap between the other polar faces.

13. A motor for loudspeakers in accordance with claim 12 in which the polar faces and the armature portions are substantially one-sixteenth of an inch long measured in the direction of movement of the armature unit.

14. A motor for loudspeakers comprising a field magnet structure having a plurality of poles whose polar faces form at least two gaps, a vibratile armature unit having portions extending into said gaps and movable therein in a path substantially parallel with said polar faces, said portions of the armature being separated by a medium of relatively high reluctance and at least one coil associated with one of the parts of the motor to effect vibration of the armature unit when energized by varying current, the effective length of the armature unit being such that when the armature unit is moved to a position in which one of said portions of the armature is completely covered by the polar faces of the corresponding field magnet poles, the other portion of the armature will not extend all the way to and reach the gap between the other polar faces.

15. A motor for loudspeakers in accordance with claim 14 in which the portions of the armature unit are substantially one-sixteenth of an inch long measured in the direction of movement of the armature.

16. A motor for loudspeakers comprising a reciprocating armature unit having longitudinal faces parallel with the direction of motion of the armature and lateral faces at right angles thereto, a field magnet structure having a pair of poles at each side of the armature unit whose polar faces are substantially parallel with the longitudinal faces of the armature unit and which form two gaps, one for each end portion of the armature unit, the armature unit being movable in a path substantially parallel with said polar faces, and a coil associated with one of the parts of the motor to effect reciprocation of the armature unit when energized by varying current, the length of the armature unit being such that when it is moved to a position in which the flux across one end portion of the armature and across the gap between the corresponding poles is the maximum the other end portion of the armature unit will project beyond those poles toward the poles forming the other gap and will be within the magnetic influence of the flux at said other gap but will lie wholly without said other gap and the lateral face of the armature nearest to said other gap will be spaced longitudinally from it.

17. In apparatus of the character disclosed, pole pieces magnetized to like polarity, oppositely magnetized pole pieces opposed in parallel closely spaced relation to the first pole pieces to form two aligned narrow magnetic gaps, a thin light non-polarized magnetic armature positioned to operate laterally in said gaps, a mechanical transmission connection engaged with said armature, means for guiding said armature for free movement in said gaps across the end faces of the opposing pole pieces with substantially constant clearance, operating coils on the pole pieces adjacent to the gaps for weakening the magnetic effect at one gap while simultaneously strengthening the magnetic effect at the other gap, said armature being free from polarizing windings and by reason of its thinness forming short direct magnetic paths for the variable operating flux across the gaps between unlike pole pieces.

18. In apparatus of the character disclosed, pole pieces magnetized to like polarity, oppositely magnetized pole pieces opposed in parallel closely spaced relation to the first pole pieces to form two aligned narrow magnetic gaps, a thin light non-polarized magnetic armature positioned to operate laterally in said gaps, a mechanical transmission connection engaged with said armature, means for guiding said armature for free movement in said gaps across the end faces of the opposing pole pieces with substantially constant clearance, operating coils on the pole pieces adjacent to the gaps for weakening the magnetic effect at one gap while simultaneously strengthening the magnetic effect at the other gap, said armature being free from polarizing windings and by reason of its thinness forming short direct magnetic paths for the variable operating flux across the gaps between unlike pole pieces, said armature comprising an elongated thin bar of magnetic material and the pole pieces being correspondingly elongated in the direction of length of said bar, substantially at right angles to the direction of movement of the bar in the magnetic gaps.

19. In apparatus of the character disclosed, pole pieces magnetized to like polarity, oppositely magnetized pole pieces opposed in parallel closely spaced relation to the first pole pieces to form two aligned narrow magnetic gaps, a thin light non-polarized magnetic armature positioned to operate laterally in said gaps, a mechanical transmission connection engaged with said armature, means for guiding said armature for free movement in said gaps across the end faces of the opposing pole pieces with substantially constant clearance, operating coils on the pole pieces adjacent to the gaps for weakening the magnetic effect at one gap while simultaneously strengthening the magnetic effect at the other gap, said armature being free from polarizing windings and by reason of its thinness forming short direct magnetic paths for the variable operating flux across the gaps between unlike pole pieces, the guiding means comprising resilient spring strips secured to the ends of the armature and extending substantially at right angles to the length of the armature.

20. In apparatus of the character disclosed a magnet yoke having bifurcated pole pieces projecting toward each other with their ends opposed in closely spaced parallel relation providing two short magnetic gaps, means for polarizing said bifurcated pole pieces, a thin light, elongated magnetic armature structure supported for rectilinear bodily reciprocation in the two magnetic gaps in a plane substantially parallel with the end faces of the bifurcated pole pieces, the ends of the bifurcated pole pieces being correspondingly elongated in the direction of length of the armature structure substantially at right angles to the direction of movement of the armature structure, operating windings on the bifurcated pole pieces for strengthening the magnetic effect across the armature structure at one of the gaps while simultaneously weakening the effect across the armature structure at the other gap, and a sound generating member having a mechanical connection with said armature structure.

In testimony whereof I affix my signature.

CLAIR L. FARRAND.